(12) United States Patent
Iida (10) Patent No.: US 6,256,411 B1
(45) Date of Patent: Jul. 3, 2001

(54) IMAGE PROCESSING DEVICE AND METHOD FOR DETECTING OBJECTS IN IMAGE DATA

(75) Inventor: Kentaro Iida, Amagasaki (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/084,868

(22) Filed: May 26, 1998

(30) Foreign Application Priority Data

May 28, 1997 (JP) .................................................. 9-138129

(51) Int. Cl.[7] .............................. G06K 9/20; G06K 9/46; G06K 9/48; G06K 9/62; H04N 1/04
(52) U.S. Cl. ........................ 382/203; 382/199; 382/215; 382/317; 358/486; 358/488; 358/493
(58) Field of Search .................................... 382/199, 203, 382/317, 215, 242; 358/453, 486, 488, 491, 493, 464

(56) References Cited

U.S. PATENT DOCUMENTS

| 4,980,781 | * | 12/1990 | Yamamoto et al. | 358/486 |
|---|---|---|---|---|
| 5,377,019 | | 12/1994 | Okisu et al. | 358/464 |
| 5,487,116 | | 1/1996 | Nakano et al. | 382/104 |
| 5,528,387 | * | 6/1996 | Kelly et al. | 358/486 |
| 5,706,419 | * | 1/1998 | Matsugu et al. | 345/435 |
| 5,742,279 | * | 4/1998 | Yamamoto et al. | 345/173 |
| 5,764,383 | * | 6/1998 | Saund et al. | 358/488 |
| 5,832,116 | * | 11/1998 | Rezzouk | 382/199 |
| 5,862,245 | * | 1/1999 | Renouard et al. | 382/203 |

FOREIGN PATENT DOCUMENTS 06251148    9/1997   (JP) .

OTHER PUBLICATIONS

Liu, et al. "optimal contour approximation by deformable piecewise cubic splines", IEEE, pp. 638–643, 1991.*

* cited by examiner

Primary Examiner—Leo Boudreau
Assistant Examiner—Daniel G. Mariam
(74) Attorney, Agent, or Firm—Sidley & Austin (57) ABSTRACT

An image processing device and method recognizing and deleting extraneous objects in image for data based on analysis of the image data. An object detection means detects an object region such as a finger or the like in a document image, and an image processing means erases part of an image corresponding to the object region of a finger or the like in the image data. The object detection means detects the object region by a dynamic contouring method in which a specific initial contour is set relative to the image data, and the initial contour is adjusted along a border of variable density in the image data so as to accurately erase an object image of a finger of a user holding a document.

19 Claims, 10 Drawing Sheets

Fig. 16

IMAGE PROCESSING DEVICE AND METHOD FOR DETECTING OBJECTS IN IMAGE DATA

FIELD OF THE INVENTION

The present invention relates to an image processing device and method for recognizing and deleting extraneous objects in image data based on analysis of the image data.

BACKGROUND OF THE INVENTION AND DESCRIPTION OF THE RELATED ART

Image reading devices, often referred to as book scanners, have become commercialized. These devices generally include an image sensing system disposed above a document table so as to create an open space several tens of centimeters in height between the document table and the image sensing system. To read a bound document such as a book, magazine or the like (hereinafter referred to as "book document"), the open faced book document is placed face upward on the document table. When the start key is turned ON, the illumination lamp is activated and the sensing system starts scanning the document surface (viewing surface). As the viewing surface is scanned, the read image is sequentially output to an external device such as a printer or a storage device. When the external device is a printer, the copy image may be printed in real time as the document is scanned. Because the document is placed face upwards on the document table, the efficiency of the reading operation is improved because the pages of a book document can be turned without lifting the document from the document table.

Because the pages of an open book tend to curl or close, book documents, unlike sheet documents, must often be pressed along the edges of the viewing surface in order to maintain an open condition for scanning. In such instances, the book scanner output image may include an image of the fingers and hands of the user in addition to the document (hereinafter referred to as "extraneous object images such as fingers"). Because images of extraneous object images such as fingers are undesirable, such images must be removed before the final scanned image is stored or output. Conventionally, the extraction of extraneous object images such as fingers from a read image is accomplished by discriminating density and color pixels in the scanned image. Such methods include, for example, methods to extract an image comprised of pixels above a constant density by checking the pixel density of an object of the document margin region (white region), and methods to extract flesh colored images from an image obtained by color image sensing (See e.g., U.S. Pat. No. 5,377,019).

A problem arises in the conventional system when scanning areas that are inclined relative to the scanner. Conventionally, when an inclined area is present, such as the finger of a user, the illumination light is positively reflected by the inclined surface of the object and is thus highlighted. Because the area which is highlighted is brighter than the background of the document (i.e., has a color the color of the illumination light), the shape of the object cannot be accurately detected by either density or color. Additionally, problems can arise when attempting to extract extraneous objects based on color discrimination especially when other factors such as manicures and the like affect the color of the object.

SUMMARY OF THE INVENTION

An object of the present invention is to accurately erase the image of extraneous objects such as the fingers of a user holding a document. A further object is to increase the speed of the reading operation by reducing the time required for data processing to extract the image of objects such as fingers.

In the present invention, a dynamic contouring method for deforming an elastic imaginary line along a boundary of variable density (brightness) is used as a region separation method of a read image to extract the image of objects such as fingers. By setting suitable elasticity, the imaginary line converges to a curve which smoothly circumscribes the image of an object such as a finger. As a result, the image of an object such as a finger can be erased by obtaining an accurate contour of the actual shape of an object and the pixel value on the interior side of the obtained contour can be substituted with a value equivalent to the background even in the case when positive reflection of illumination light causes an abnormal density distribution.

The initial value of the imaginary line is initially set for efficient extraction. Since objects such as fingers holding a document typically appear in the margins of the document, a straight line or curved line arranged near the edges of the document is preferably set as the initial value.

According to one embodiment of the present invention, an image reading device is provided with an object detection means for detecting an object region of a finger or the like in a document surface based on the read image of the document, and an image processing means is provided for erasing part of an image corresponding to the object region. The object detection means extracts the object region by use of a dynamic contouring method where a specific initial contour corresponding to the image is set such that the initial contour is deformed along the boundary of variable density in the read image.

In another aspect of the present invention, the image reading device is provided with a means for detecting the edge of the document, and the object detection means sets the initial contour to a straight line with fixed endpoints having a deformation tendency extending to the interior side along the document edge and having a position on the exterior side of the detected edge.

In another aspect of the present invention, the image reading device is provided with a means for detecting the edge of the document and a means for detecting a specific density area which straddles the detected edge in the read image. Here, the object detection means sets as an initial contour a curve through the first and second intersection points of intersection of a detected edge and the contour of a detected specific density area.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

This application is based on Japanese Patent Application No. HEI 9-138129, the content of which is hereby incorporated by reference.

Figure 1:
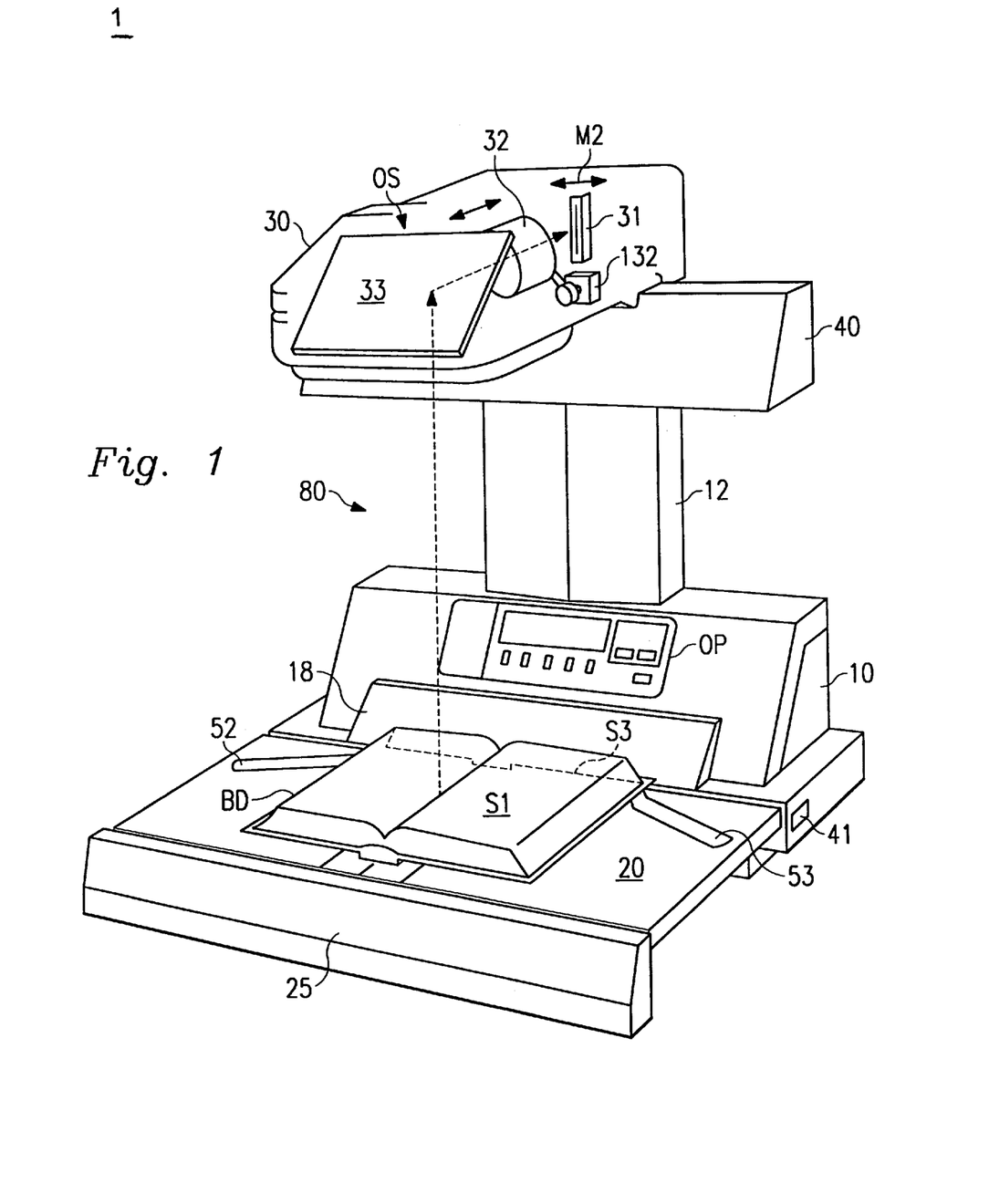
FIG. 1 is a perspective view showing an external view of a book scanner.
Figure 2A:
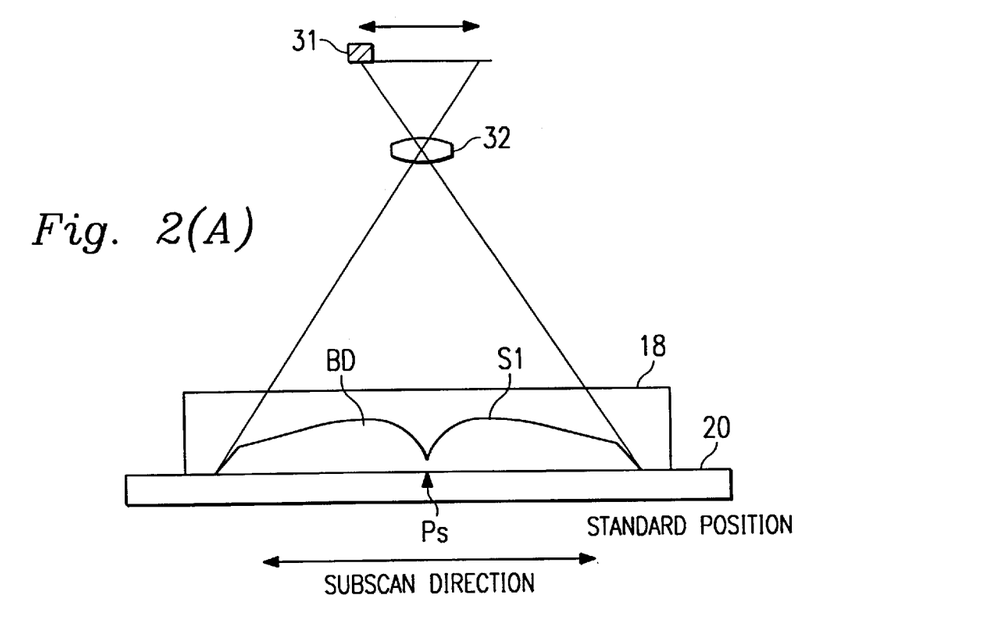
FIGS. 2(A) and 2(B) illustrate the reading mode of the book scanner.
Figure 2B:
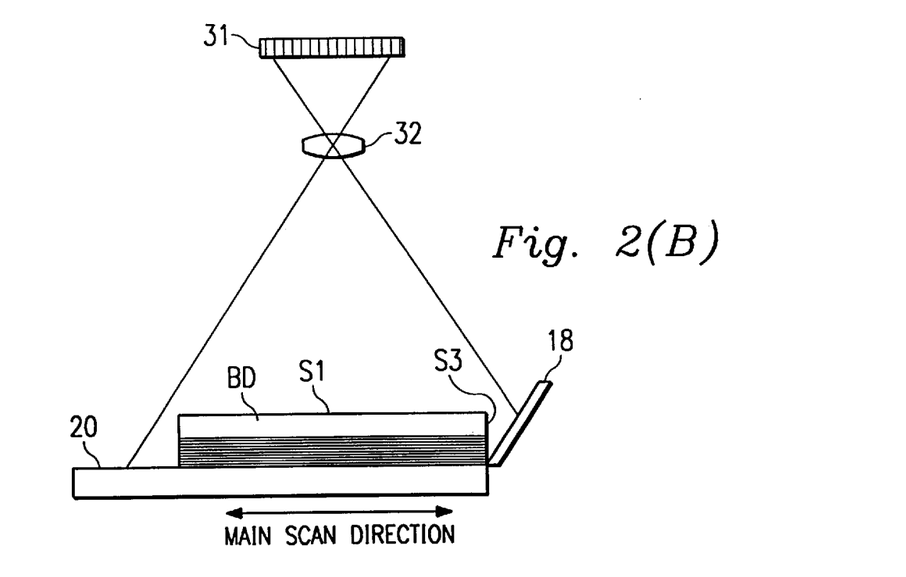
Figure 3:
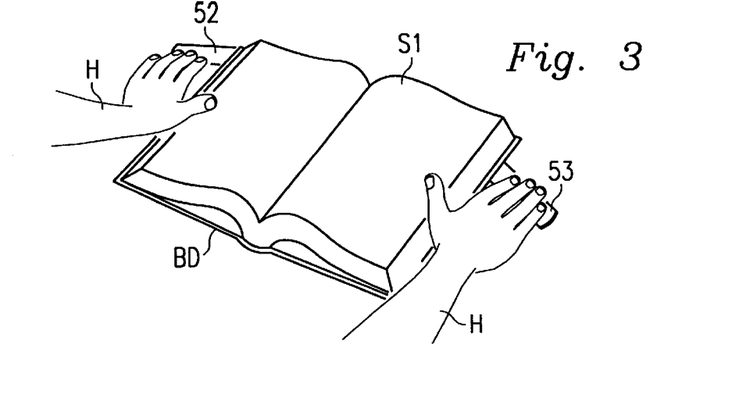
FIG. 3 shows a document held by the fingers of a user.

The following description will be made in reference to FIG. 1, which is a perspective view showing an exterior view of a book scanner 1, FIGS. 2(A) and 2(B), which respectively illustrate the reading modes of book scanner 1, and FIG. 3, which illustrates fingers of a user holding a document.

Book scanner 1 is an image reading device suitable for reading a book document BD, and comprises a housing 10 which accommodates electric power circuits and the like, a document table 20 for supporting a document, an image sensing unit 30 for converting a document image to electric signals, and a lamp unit 40 for illuminating a document. Document table 20 is provided at the front side of housing 10, and is a dark color so as to allow a document to be readily discriminated from the document table. Image sensing unit 30 is disposed above document table 20, and is supported in cantilever mode by a column 12 extending upward from the top surface of housing 10. An open space 80 formed between document table 20 and the image sensing unit 30 is of a size sufficient to accommodate the placement of a book document. Lamp unit 40 is mounted at the back edge of the bottom surface of image sensing unit 30 to illuminate document table 20 from above.

An operation panel OP is provided on the front surface of housing 10, and a main switch 41 is provided on the right side surface as viewed facing the operation panel OP. A projection panel 18 for detecting document height is provided at the bottom edge of the front surface of housing 10. The front surface of projection panel 18 is a glossy surface which is inclined at a 45° angle relative to the top surface of document table 20. The image of edge surface S3 of book document BD is reflected in projection panel 18, and the glossy surface of projection panel 18 bearing a reflected image of book document edge surface S3 is read together with the document image. Start keys 52 and 53 are respectively provided on the left and right sides of document table 20, and an armrest 25 is mounted on the front side thereof.

Image sensing unit 30 is provided with a line sensor 31 comprising a charge-coupled device (CCD) array, image forming lens 32, and mirror 33. A document image is projected onto the photoreceptor surface of line sensor 31 via an optical system OS comprising mirror 33 and image forming lens 32. Image forming lens 32 is provided so as to be movable in front-to-back directions, and its position is determined by an autofocus (AF) mechanism 132. Line sensor 31 is mounted on a movable body (scanner) of a subscanning mechanism not shown in the drawing, so as to move parallel to a lateral direction (subscan direction) M2 while maintaining the direction of the array of the CCD elements in a vertical direction. The main scan direction of the document image is a front-to-back direction on the document table 20, and a vertical direction on the image sensing plane.

When using the book scanner 1, a user places a book document BD on the document table 20 in a face-upward condition with the document viewing direction aligned with the lateral direction of document table 20. Next, the border (viewing center) between the right and left pages of document surface (viewing surface) S1 is aligned with a mark indicating the center of document table 20 in a lateral direction, and the book document BD is pressed against the bottom edge of projection panel 18 to accomplish positioning in the front-to-back direction. The border between the projection panel 18 and the document table 20 is used as a centering reference line. The center of this reference line is designated as standard position Ps as shown in FIG. 2(A). A user manually presses the edges of book document BD as necessary (FIG. 3) to maintain the document in a viewable open state. Although it is possible to hold the front side edge of the book document BD (i.e., along the front side of the document table), the bilateral edges of the book document BD in a lateral direction will typically be pressed so that the user may operate start keys 52 and 53 while holding the book document BD in place. Therefore, the bilateral edge in the lateral direction of book document BD are scrutinized when detecting extraneous object images such as fingers (described later) to eliminate unnecessary images.

Book scanner 1 executes a prescan and actual scan for a single document image. The height distribution of viewing surface S1, document size, and background luminance of the document are measured, and the areas held by the fingers of a user are detected based on reading information obtained in the prescan. The actual scan operating conditions are set based on the detection results and measured values obtained from the prescan. In the actual scan, focus is adjusted by moving the image forming lens 32 so as to match progress in the subscan direction, and image distortion correction and masking to erase extraneous object images such as fingers are executed. The image read in the actual scan is output to an external device.

Figure 4:
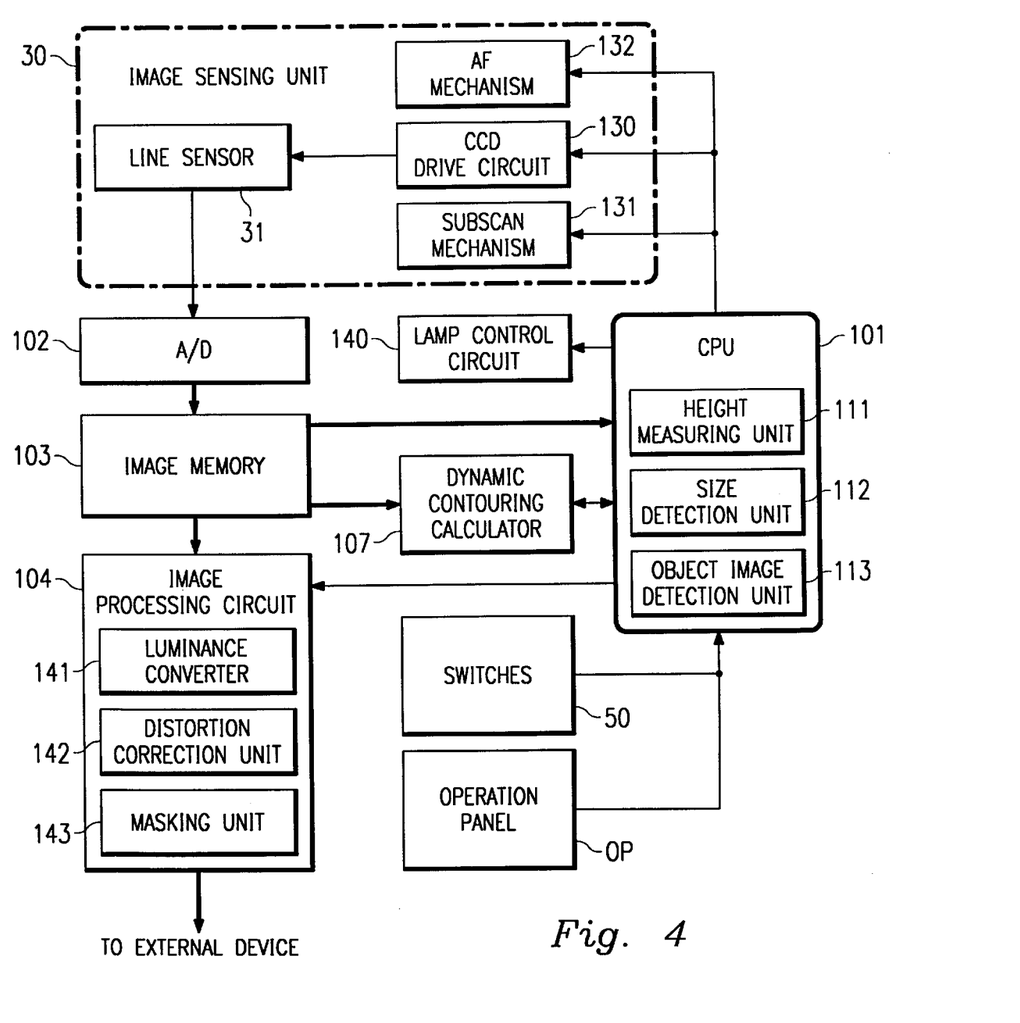
FIG. 4 is a block diagram showing the functions of the essential parts of the book scanner.

The following description is in reference to FIG. 4 which is a block diagram showing the essential functions of book scanner 1.

Book scanner 1 is controlled by a central processing unit (CPU) 101 provided with a microcomputer. CPU 101 is connected to CCD drive circuit 130 which supplies clock signals to line sensor 31, subscan mechanism 131 which moves the line sensor in the subscan direction, AF mechanism 132 which moves image forming lens 32 to focus on the document, and lamp control circuit 140 which controls the lighting of the lamp unit 40. Operation panel OP, switches 50, and various sensors are connected to CPU 101 to impart operating instructions to the image processing circuit 104.

Photoelectric conversion signals output from the line sensor 31 of image sensing unit 30 are converted, for example, to 8-bit image data by analog-to-digital (AD) converter 102. Image data output from AD converter 102 in pixel array sequence are temporarily stored in image memory 103. During the prescan, image data are input to CPU 101 and dynamic contouring calculator 107. CPU 101 includes function elements, i.e., height measuring unit 111, size detection unit 112, and object image detection unit 113. Height measuring unit 111 measures the height distribution of document surface S1 and is summarized later. Size detecting unit 112 detects the left and right edges of book document BD based on the image data. Object image detection unit 113 scrutinizes the area corresponding to the bilateral edges of the document in the read image, and detects an area of specific density range as an extraneous object image such as a finger. Dynamic contouring calculator 107 is a structural element relating to the dynamic contouring method of the present invention, and calculates the convergence to deform the initial contour received from CPU 101 to the contour of an extraneous object image such as a finger.

In the actual scan, focusing is accomplished to match the progress in the subscan direction, and image data read in the focused state are input to image processing circuit 104 via image memory 103. Image processing circuit 104 is provided with a luminance converter 141 to optimize density reproduction characteristics based on a luminance histogram, distortion correction unit 142 to accomplish variable magnification of an image in accordance with the height distribution, and a masking unit 143 to erase extraneous images included in an object image such as fingers. The image processing circuit 104 executes data processing as specified by CPU 101. The erasure of extraneous images is accomplished by a process of substituting pixel values with background density values. Image data output from image processing circuit 104 are transmitted to an external device. Examples of an external device include printer, display, image memory devices, image editors (computer systems) and the like.

Figure 5A:
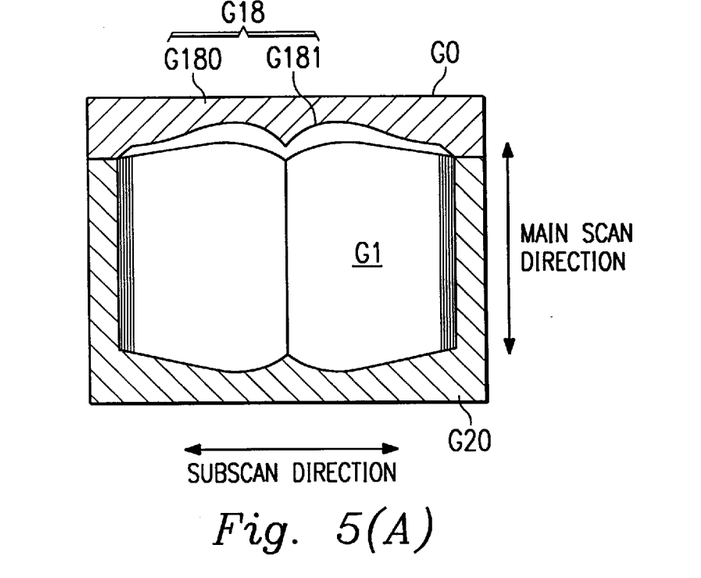
FIGS. 5(A) and 5(B) illustrate the method of measuring the height distribution of the document surface.
Figure 5B:
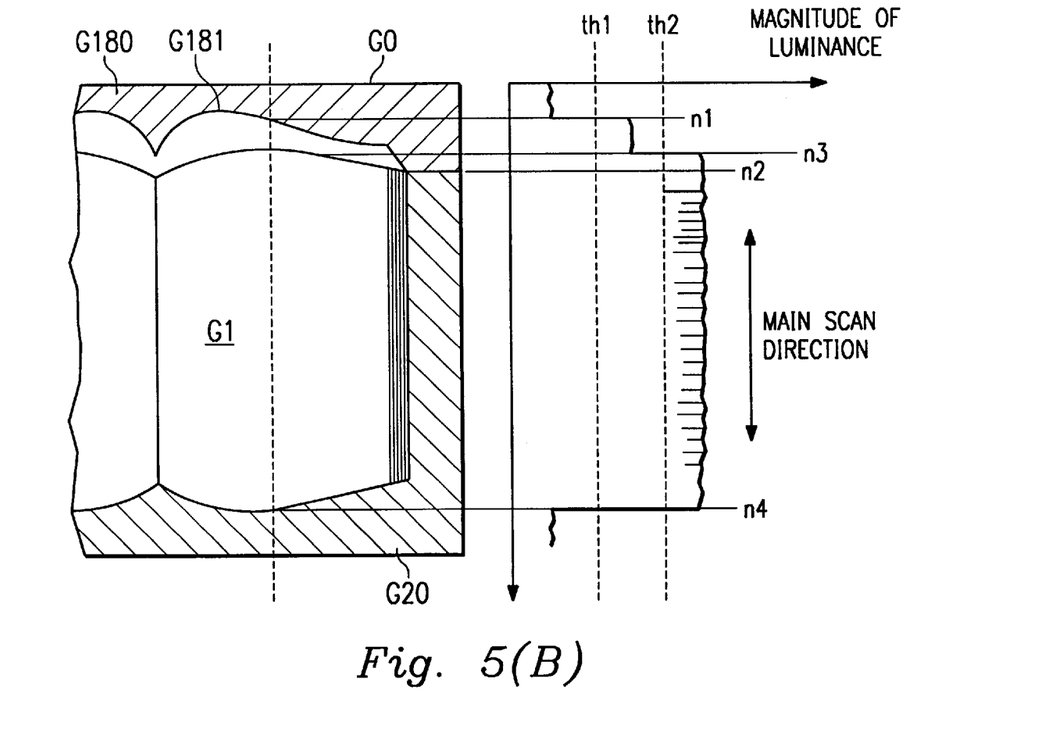

FIGS. 5(A) and 5(B) illustrate the method of measuring height distribution of a document surface. The broken line in FIG. 5(B) indicates the position of the target line. In this example, image reading is accomplished without a user holding the document.

The read image G0 comprises many components including read image G1 of the top surface of book document BD (top surface image), read image G20 of document table 20, and read image G18 of the projection panel 18. Read image G18 is composed of two images G181 and G182. Image G181 indicates the shape of the edge surface S3 of the book document BD. Image G180, outside image G181 (edge image), is a background image reflected in projection panel 18. Since an object near the image sensing plane is read larger than an object farther from the image sensing plane, the bilateral edges of top surface image G1 are curved in the main scan direction (front-to-back direction).

Since the document table 20 is a dark color, the read image G20 is a darker image than other images. Furthermore, since document surface S1 and edge surface S3 are bright, the edge surface image G181 is brighter than background image G180. Therefore, top surface image G1 and edge surface image G181 can be extracted by discriminating the magnitude of luminance, and the document size and height distribution of document surface S1 can be measured. Specifically, brightness (pixel value) is checked sequentially from a first pixel in the main scan direction at each sampling position (line) of predetermined intervals, and the pixel position (pixel number) n1 on the top side of a range in which brightness exceeds a first threshold value th1 is detected, and pixel positions n3 and n4 on the top and bottom sides of a range in which brightness exceeds a second threshold value th2 (th2>th1) are detected. The number of pixels between pixel position n1 and pixel position n2 corresponding to projection panel 18 corresponds to the height of document surface S1 in the target line, and the number of pixels between pixel position n3 and pixel position n4 corresponds to the document size in the main scan direction. The actual dimensions of the document are determined by dividing the number of pixels by the image reading resolution. The state of curvature of the document surface S1, i.e., the document height distribution, is specified by combining data indicating height of document surface S1 of all lines of the sampling. The positions of the first and last lines at which pixel positions n3 and n4 are detected correspond to the bilateral edges of the document in the subscan direction.

A summary of the detection of an extraneous object image such as a finger by use of the dynamic contouring method characteristics of the present invention is described next.

Figure 6:
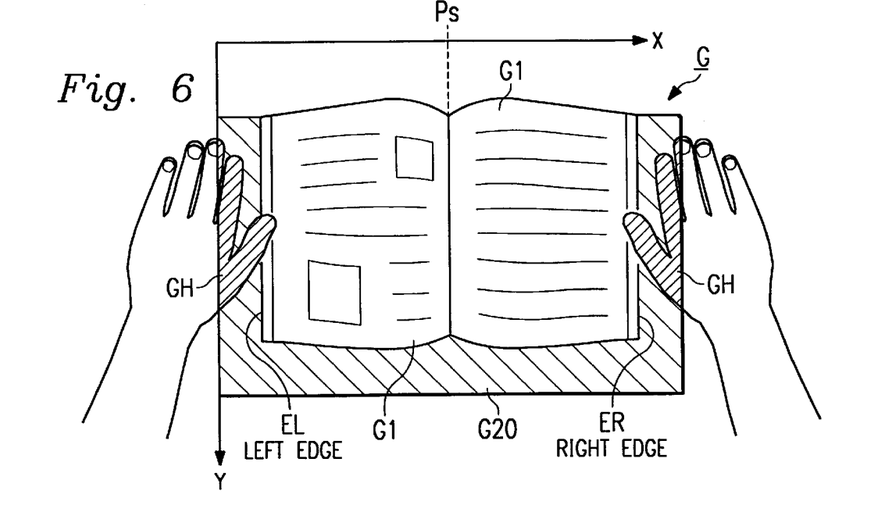
FIG. 6 shows the essential part of a read image corresponding to FIG. 3.
Figure 7A:
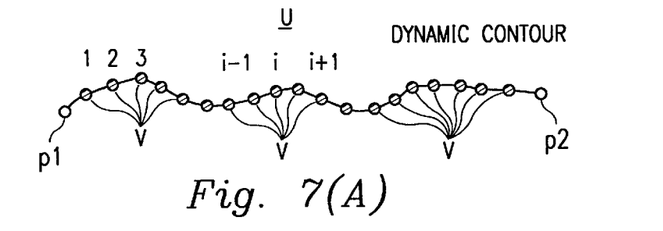
FIGS. 7(A) and 7(B) illustrate the essence of dynamic contouring.
Figure 7B:
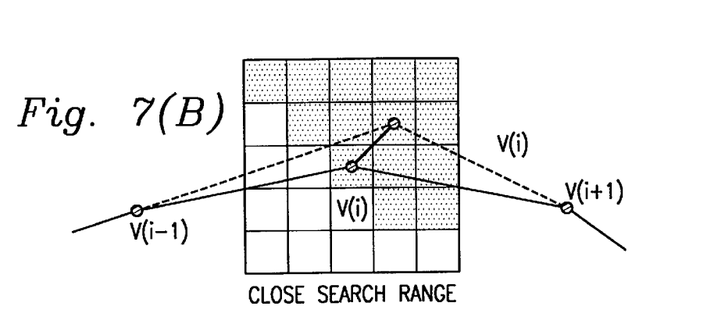
Figure 8:
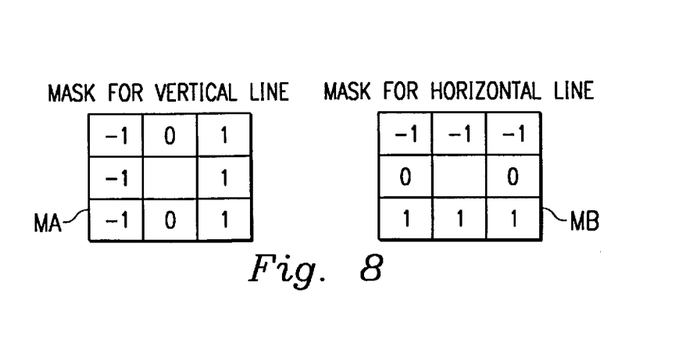
FIG. 8 shows an example of an operator mask calculating the edge intensity.
Figure 9A:
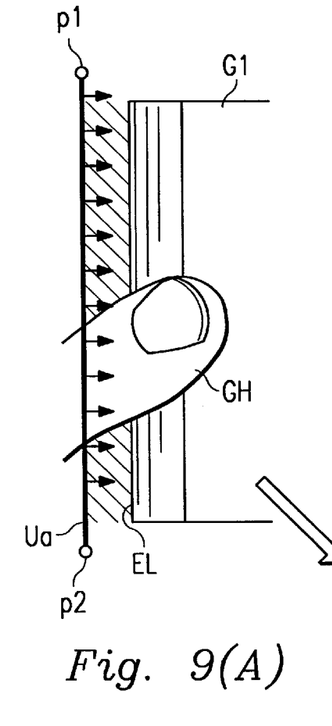
FIGS. 9(A)–(C) show the process of detecting an object image of a finger.
Figure 9B:
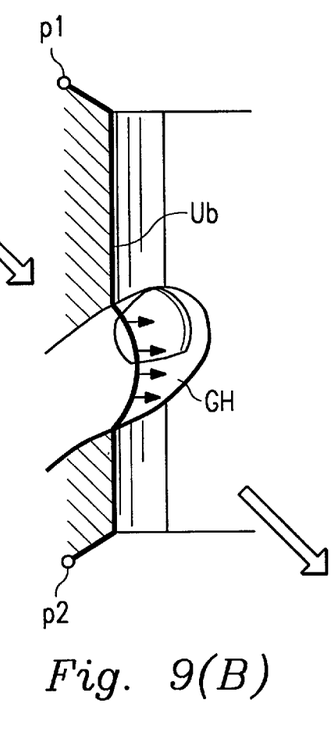

FIG. 6 shows the essential part of the read image corresponding to FIG. 3, FIGS. 7(A) and 7(B) briefly illustrate the dynamic contour, FIG. 8 shows an example of an operator mask for calculating edge intensity, and FIGS. 9(A) and 9(B) illustrate the process of detecting an object image such as a finger.

In FIG. 6, the read image G comprises a top surface image G1 of book document BD, read image G20 of document table 20, and object image GH of a finger or the like. The left edge EL and right edge ER of top surface image G1 correspond to the bottom edge of the bottom surface in the viewing direction of the book document BD, and can be extracted based on the difference in brightness between document table 20 and book document BD as previously described. CPU 101 sets the initial value of the dynamic contour (initial contour) relative to read image G obtained in the prescan.

As shown in FIG. 7(A), dynamic contour U in the present embodiment is a non-annular line having two endpoints p1 and p2, and a collection of separated points matching a plurality of nodes v arrayed precisely between the endpoints p1 and p2. Endpoints p1 and p2 are fixed, and the contour is deformed in accordance with the movement of each node v. The first movement of the No. i node v(i) counting from the endpoint p1 side is a position of a pixel having a minimum combined energy E1 outside all nodes v and energy E2 inside all nodes v among the pixels belonging to a pixel matrix (close search range) of predetermined size and having node v(i) as its center.

The external energy E1 and internal energy E2 are defined by the following equations:

$$E1 = a^*(\text{edge intensity}) + b^*(\text{pressure}) \quad (1)$$

$$E2 = g^*(\text{linear differential}) + d^*(\text{quadratic differential}) \quad (2)$$

where a, b, g, and d are weighted coefficients (positive numbers).

The edge intensity is an indicator of the degree of change in brightness of each pixel in the close search range. For example, as shown in FIG. 8, the edge intensity is calculated by calculating the difference operator using Prewitt type masks MA and MB. The pressure is a factor moving in the set direction regardless of variable density. The top left edge of the image is designated the origin point of an XY coordinate system (the X-axis being the subscan direction, and Y-axis being the main scan direction), and the pressure is $x(i)-x(t)$ in the detection of object image GH of fingers on the left-hand side, and the pressure is—$[x(i)-x(t)]$ in the detection of object image GH on the right-hand side. The value $x(i)$ is the X coordinate of node $v(i)$, and the value $x(t)$ is the X coordinate of each pixel in the close search range of node $v(i)$. In the following discussion, the Y coordinate of node $v(i)$ is expressed as $y(i)$, and the Y coordinate of the pixel of the close search range of node $v(i)$ is expressed as $y(t)$.

The linear differential is a factor which is minimized when the node v is an equally spaced array (restricting the local expansion and contraction), and is represented by the equation below:

$$\text{Linear differential} = \{[x(i-1)-x(i)]^2 + [y(i-1)-y(t)]^2\}^{1/2} - d \quad (3)$$

where d represents the mean distance between nodes.

The quadratic differential is a factor minimized when the nodes v are equally spaced in the same direction (imparting local smoothness), and is represented by the equation below.

$$\text{Quadratic differential} = |x(i-1)-2x(t)+x(i+1)| + |y(i-1)-2y(t)+y(i+1)| \quad (4)$$

Detection of an object image GH of a finger or the like is accomplished by designating the bilateral edges of the book document BD sequentially as the object range. A straight line from the left edge EL to the right edge ER is set as the initial contour. For example, when detecting the object image GH such as a finger or the like on the left-hand side, the straight line Ua on the exterior side of left edge EL (side farthest from standard position Ps) is set as shown in FIG. 9(A). Since the deformation (i.e., divergence of the actual contour from a straight line) rapidly converges as the distance between the left edge EL and the right edge ER becomes smaller, it is desirable that the straight line Ua approaches the left edge EL or right edge ER as much as possible in view of error in detection at bilateral sides.

Figure 9C:
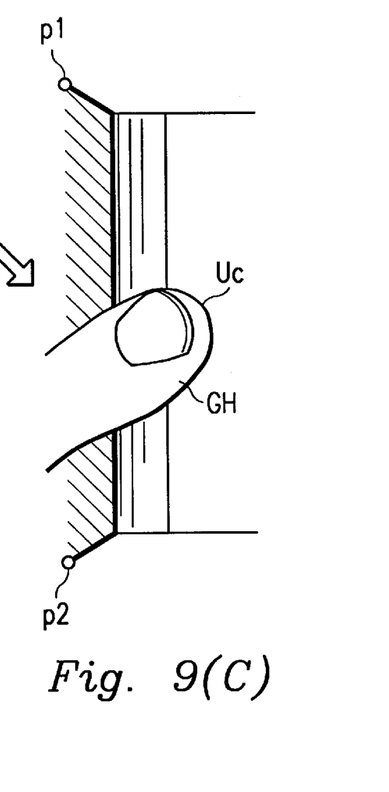

According to equation (1) above, the straight line Ua possesses a deformation trend extending to the interior side (viewing center side) because pressure is added to the exterior energy E1. Therefore, the nodes move to the interior side even though the area has the same density as in the read image on document table 20. At the stage FIG. 9(B), part of contour Ub obtained by the deformation of straight line Ua matches the left edge EL, and the movement of the nodes of this area converge and no further movement of the nodes occurs. When deformation reaches the stage shown in FIG. 9(C), the contour Uc is obtained which smoothly circumscribes an area overlapping the document in an object image GH such as a finger or the like and the masking region is thus defined. In masking, the area circumscribed by contour Uc and the line (pixel array in the main scan direction) at the position of left edge EL as well as the area on the exterior side of the line may be erased.

An example of setting a curve as the initial contour is described next for detecting an object image GH such as a finger or the like from the left-hand side.

Figure 10:
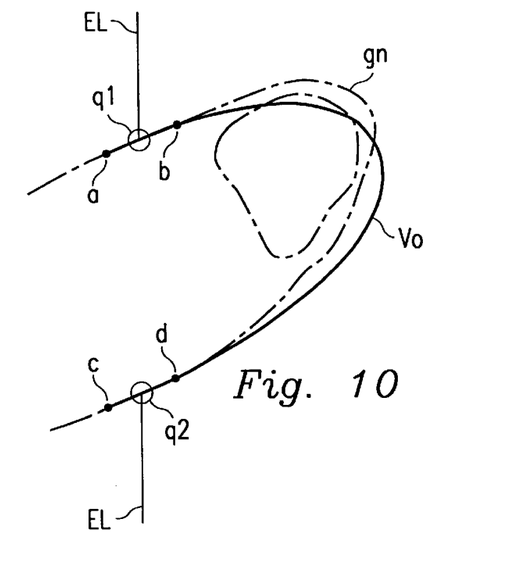
FIG. 10 illustrates the setting of a curve.

FIG. 10 briefly illustrates the setting of the curve, and FIG. 11 shows another example of the detection of an object image such as a finger or the like.

The contour gh of an object image GH, such as a finger or the like, is determined by an edge detection/thinning process relative to a read image. Four points a, b, c, d on contour gh are specified as having the intersection points q1 and q2 of contour gh and left edge EL interposed therebetween. In other words, q1 and q2 represent the upper and lower points, respectively, where the contour gh and the left edge EL intersect. Points a and b are on the contour gh with intersection point q1 positioned therebetween. Similarly, points c and d are on the contour gh with intersection point q2 therebetween. The distance between points a and b and intersection q1, and the between points c and d and intersection q2 are a suitable value equivalent to 2 or 3 mm on document table 20. A spline curve V0 is calculated through points a, b, c, and d connecting the two points b and d on the interior side of left edge EL.

Figure 11A:
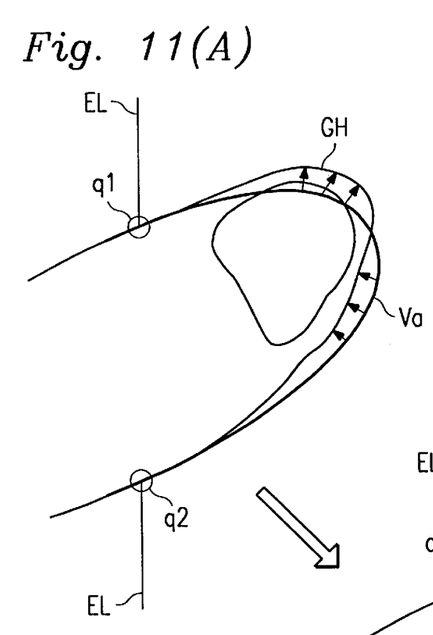
FIGS. 11(A) and 11(B) show another example of the detection of an object image of a finger.
Figure 11B:
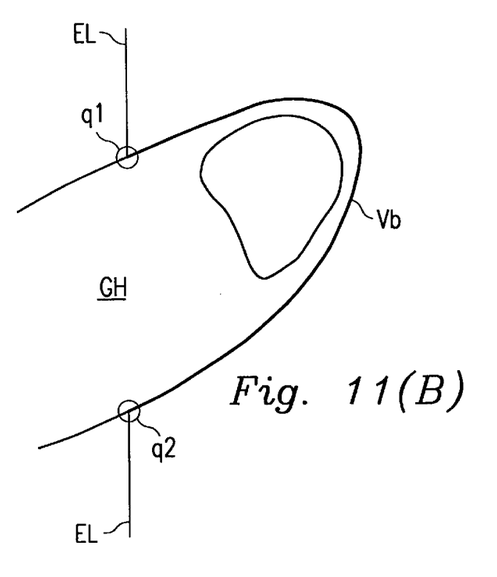

A curve Va of the area from intersection q1 to intersection q2 of the spline curve V0 is set as the initial contour, as shown in FIG. 11(A). The intersections q1 and q2 are endpoints of curve Va. These endpoints are fixed, and the nodes forming curve V0 are moved so as to minimize the sum of the exterior energy E1 and interior energy E2 in the same manner as in the previous example. The calculation for this movement is executed by the dynamic contour calculator 107. In this instance, since the displacement between the curve Va and the object image GH is small, there is no problem even if the weighted coefficient b of pressure in equation (1) is designated zero. A smooth curve Vb circumscribing the object image GH is obtained as shown in FIG. 11(B) by repeating the movement of the nodes.

The operation of book scanner 1 is described hereinafter with reference to the flow charts.

Figure 12:
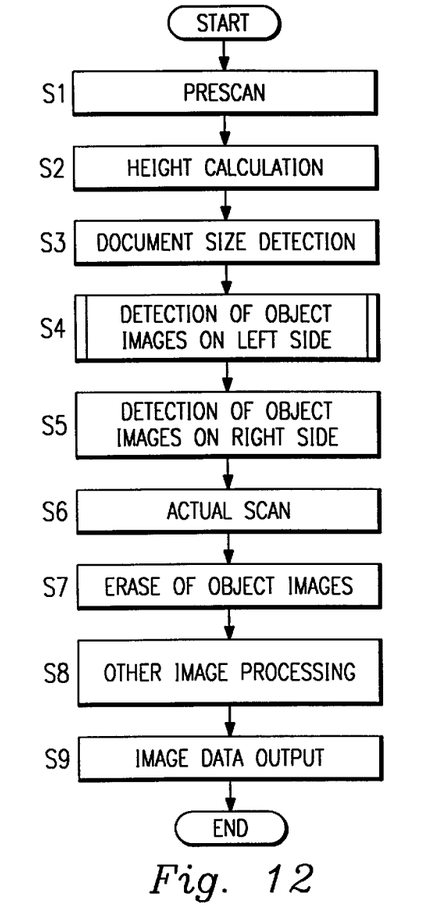
FIG. 12 is a brief flow chart of the book scanner operation.

FIG. 12 is a brief flow chart of the operation of book scanner 1. The illumination lamp is turned ON when start key 52 or 53 is turned ON and a prescan is executed in step S1. Next, an image read in the prescan is read from image memory 103, and the document height is calculated in step S2. After the height is detected, the document size is detected in step S3, and detection of extraneous object images, such as fingers or the like, on the left side is executed step S4. Next, detection of object images on the right side is executed step S5. After predetermined operations are set, the document image is focused and read in an actual scan in step S6. Extraneous object images such as fingers and the like are erased in the read image obtained in the actual scan in step S7, and other image processing is executed in step S8. Finally, the read image information is output to an external device in the same manner as for sheet documents in step S9.

Figure 13:
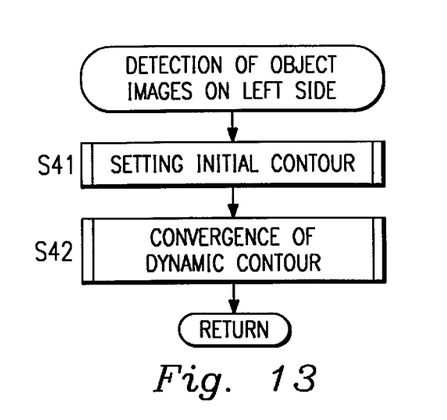
FIG. 13 is a flow chart of the subroutine for detecting an object image of a finger on the left side of a book document.

FIG. 13 is a flow chart of the subroutine for detecting extraneous object images such as fingers on the left side.

A specific initial contour Ua is set using position information of the left edge EL obtained by document size detection in step S41. A convergence algorithm is calculated to deform the initial contour Ua to a shape corresponding to the object image GH in step S42. Detection of an object image on the right side is accomplished in the same manner as detection of the object image on the left side by setting a specific initial contour using position information of the right edge ER.

Figure 14:
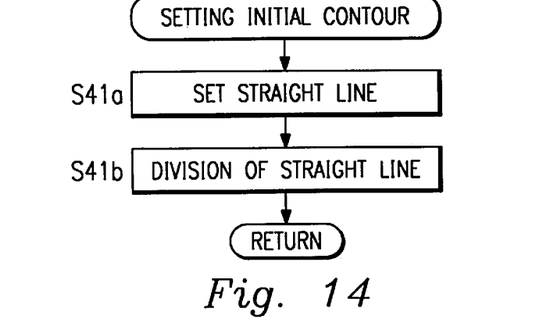
FIG. 14 is a flow chart of a subroutine for setting an initial contour corresponding to the image depicted in FIG. 9.

FIG. 14 is a flow chart of the subroutine for setting an initial contour corresponding to FIG. 9.

A straight line is set near the document edge (left edge EL) in step 41a. The straight line is divided into equally spaced segments, and the division points are designated nodes v to set an initial contour in step S41b.

Figure 15:
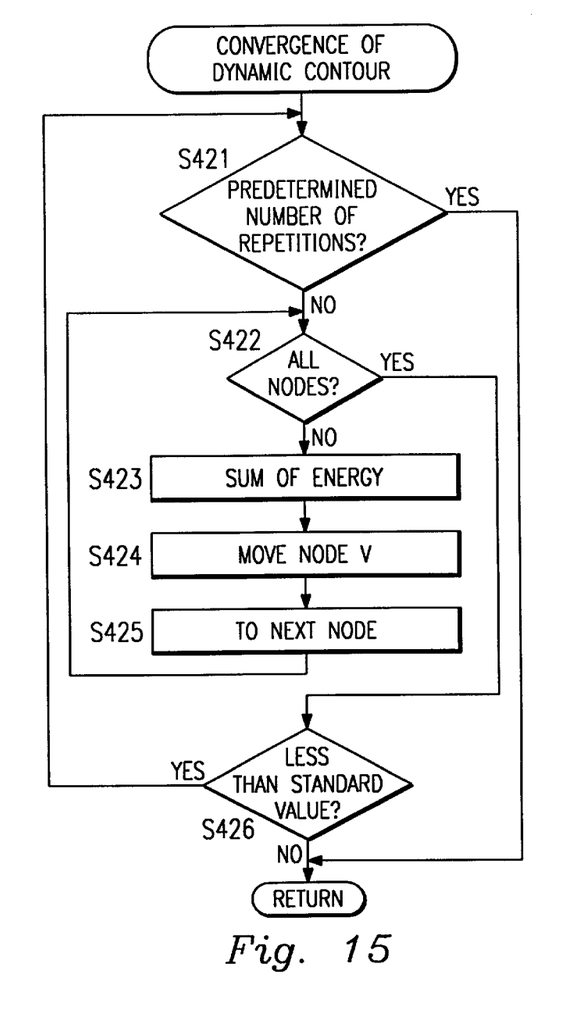
FIG. 15 is a flow chart of a subroutine for converging the dynamic contour.

FIG. 15 is a flow chart of a subroutine for convergence of a dynamic contour.

The essence of this subroutine is described below. The sum of energy is determined at each position of a near search range of a target node v (step S423), and node v is moved to a pixel position at which the sum is minimized (step S424). This operation is executed once for all nodes v in sequence (step S425 and S422). Although it is desirable that these processes are repeated (step S421) until the number of moved nodes v converge to less than a standard value, the routine may be forcibly ended when the number of repetitions attains a constant value due to the difficulty of setting a standard value (step S426 and S421).

Figure 16:
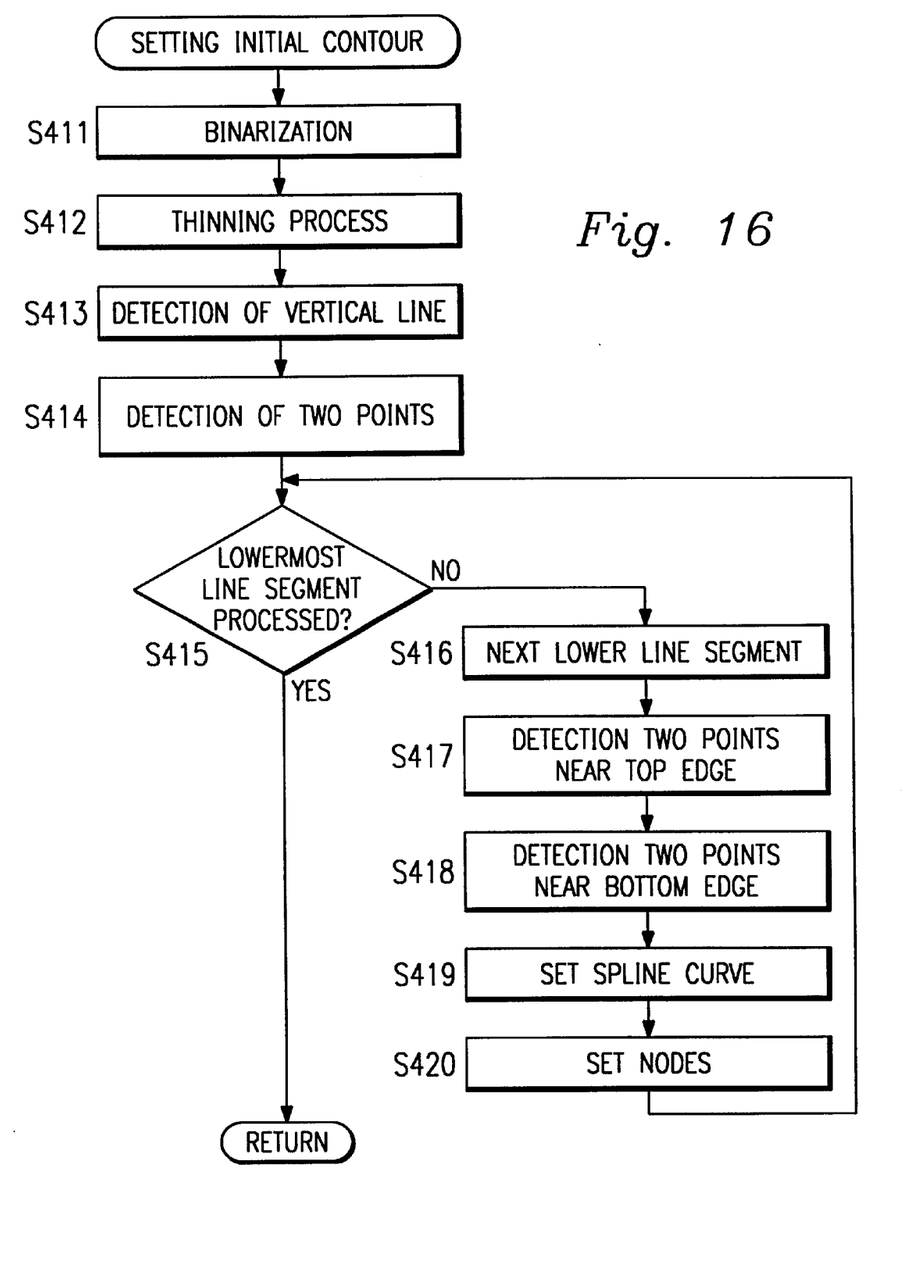
FIG. 16 is a flow chart of a subroutine for setting an initial contour corresponding to the image depicted in FIG. 11.

FIG. 16 is a flow chart of a subroutine for setting an initial contour corresponding to FIG. 11 of the present embodiment.

An edge detection process is executed by a differential operator on the read image obtained in the prescan so as to binarize the remaining contour of the document edge and an object image (step S411). The contour of the document edge and the object image can be readily tracked by thinning the binarized image via the well-known Hilditch thinning method (step S412). Next, the vertical line of the edge of the left edge EL (or the right edge ER when detecting the right side) is detected (step S413). An area having a specific continuity in the main scan direction may be detected and specified as the vertical line, or a straight line area may be detected by a well-known vector tracing method if pure processing is difficult due to a multiplicity of fine undulations. It should be noted that because an extraneous object, such as a finger or the like, will bisect the book edge, two or more discontinuous vertical line segments may be detected when the edge detection process is executed. Furthermore, because more than one object may bisect the book edge, there may be three or more vertical line segments as well as more than one contour gh of an object image GH to be processed. In the following description, each of a possible plurality of vertical line segments will be referred to by their relative positions.

After the edge detection process is executed, a point detection process is performed for each of the plurality of vertical line segments. As will be described, the points detected correspond to the points a, b, c, and d which are shown in FIG. 10. For each contour gh of an object image GH there will be one set of points corresponding to points a, b, c, and d. Because there may be more than one contour gh due to a plurality of object images, there may be more than one set of points corresponding to points a, b, c, and d. The relationship to the points detected in the point detection process and the points a, b, c, and d shown in FIG. 10 will be described below.

As described above, the contour gh may be detected by a thinning process. Determining points near the intersection of the contour and the detected vertical line segments is the basis for the following process. Beginning with the uppermost vertical line segment, two points are detected near the bottom end of the thinned contour line segment which intersects the bottom edge of an uppermost vertical line segment. Because the intersection is at the bottom edge of a vertical line segment, these points correspond to points a and b shown in FIG. 10 for a first, of possibly a plurality of, object image(s) GH. The two points are stored in memory (step S414). Next, points are detected for the next vertical line segment which is positioned below the uppermost vertical line segment. For the next vertical line segment, two points are detected near the bottom end of the thinned contour line segment which intersects the top edge of the vertical line segment, and two more points are detected along the thinned contour line segment which intersects the bottom edge of the next vertical line segment. The process of detecting points is repeated for each sequential vertical line segment. Following each sequential vertical line segment, a determination is made as to whether or not the lowermost vertical line segment has been processed in step S415. If the lowermost line segment has not been processed, the next lower line segment is set as the processing target (step S416).

Detection of the points corresponding to the second vertical line segment is described next in more detail. Two points are detected near the top edge of the thinned contour line intersecting the top edge of the target vertical line segment, and the detected points are stored in memory (step S417). These two points correspond to points c and d in FIG. 10 for a first object image GH. Next, two points are detected near the bottom edge of the thinned line intersecting the bottom edge of the target line segment and these points are stored in memory (step S418). These two points correspond to points a and b in FIG. 10 for a second object image GH. A spline curve is set through the four points including the two points near the top edge of the line segment and the two points near the bottom edge of the next higher line segment (step S419). The set spline curve is then divided in equal spaced divisions and the division points are set as nodes (step S420). Identical processing is executed for all line segments by repeating steps S415–S420.

Thus, among the points a, b, c, and d described in FIG. 10, points a and b correspond to the bottom edge of a first line segment, and points c and d correspond to the top edge of a second line segment disposed one segment lower than said first line segment. When, for example, a thumb and forefinger overlap the document surface S1, there is a possibility that a plurality of separate object images GH may be mutually above and below the edge of the document. Therefore, a spline curve V0 is calculated through points c and d corresponding to a certain line segment, and points a and b corresponding to the bottom edge of the next higher line segment among a plurality of line segments at the position of the document edge. In the case of a single line segment, calculation of the spline curve V0 is unnecessary because there is no object image GH present.

In the present embodiment, a bezier curve or other parametric curve may be set as the initial contour rather than the spline curve V0. Also, the content of the mask used for calculation of the number of nodes (division density), close search range matrix size, and edge intensity may be suitably selected.

When using a second embodiment, the time required for data processing to extract an object image of a finger or the like may be reduced to accelerate the reading operation.

Although the present invention has been fully described by way of examples with reference to the accompanying drawings, it is to be noted that various changes and modification will be apparent to those skilled in the art. Therefore, unless such changes and modifications otherwise depart from the scope of the present invention, they should be construed as being included therein.

What is claimed is:

1. An image processing device comprising:
   an object detection means for detecting an object region of an object in image data;
   an image processing means for erasing part of an image corresponding to said object region in said image data; and
   a means for detecting an edge of a document in said image data;
   wherein said object detection means detects said object region by setting an initial cotour based on said image data, and deforms said initial contour along a border of variable density in said image data so as to determine said object region, and
   wherein said initial cotour is set as a straight line of fixed endpoints having a deformation tendency extending to an interior side of said document along the detected edge, said straight line being initially positioned on an exterior side of said detected edge.

2. An image processing device comprising:

an object detection means for detecting an object region of an object in image data;

an image processing means for erasing part of an image corresponding to said object region in said image data;

wherein said object detection means detects said object region by setting a specific initial contour corresponding to said image data, and deforms said initial contour along a border of variable density in said image data;

a means for detecting an edge of a document in said image data; and a means for detecting a specific density area straddling said detected edge in said image data;

wherein said object detection means sets as an initial contour a curve through first and second intersection points of the intersection of said detected edge and a detected specific density area.

3. An image processing device in accordance with claim 2, wherein said object detection means detects said object region by detecting a boundary in said image data and setting an initial object perimeter curve based on said detected boundary.

4. An image processing device in accordance with claim 3, wherein said object detection means adjusts said initial object perimeter curve based on density differences in said image data until an adjusted object perimeter curve approximates an actual perimeter of said object region.

5. An image processing device in accordance with claim 4, wherein said image processing means erases said portion of an image corresponding to said object region in said image data by substituting a background image value for image values on an interior side of said adjusted object perimeter curve.

6. an image processing device in accordance with claim 4, wherein said initial object perimeer curve is adjusted by an iterative method until said adjusted object perimeter curve converges to an actual perimeter of said object region.

7. An image processing device comprising:

an object detection means for detecting an object region in image data which corresponds to an extraneous object in said image data, said object detection means detecting said object region by setting an initial object perimeter curve based on said image data and adjusting said initial object perimeter curve until said adjusted object perimeter curve approximates an actual perimeter of said object region;

an image processing means for erasing said object region in said image data based on said adjusted object perimeter curve; and a means for detecting an edge of a document in said image data;

wherein said object detection means sets said initial object perimeter curve as a single straight line on an exterior side of the thus detected document edge.

8. An image processing device in accordance with claim 7, wherein said object detection means adjusts said initial object perimeter curve based on density differences in said image data until said adjusted object perimeter curve approximates an actual perimeter of said object region.

9. An image processing device in accordance with claim 7, wherein said image processing means for erasing said object region in said image data erases said object region in said image data by substituting a background image value for image values on an interior side of said adjusted object perimeter curve.

10. An image processing device in accordance with claim 7, wherein said image data corresponds to an image of a document disposed in a face upward condition.

11. An image processing device in accordance with claim 7, further comprising:

an image sensor to be disposed above a document to be read for reading image data of a document.

12. An image processing device in accordance with claim 7, wherein said initial object perimeter curve is adjusted by an iterative method until said adjusted object perimeter curve converges to an actual perimeter of said object region.

13. An image processing device comprising:

an object detection means for detecting an object region in image data which corresponds to an extraneous object in said image data, said object detection means detecting said object region by setting an initial object perimeter curve and adjusting said initial object perimeter curve until said adjusted object perimeter curve approximates an actual perimeter of said object region;

an image processing means for erasing said object region in said image data based on said adjusted object perimeter curve;

means for detecting an edge of a document in said image data; and means for detecting a density region in said image data;

wherein said object detection means detects first and second intersection points between said detected edge of said document and said detected density region, and sets an initial object perimeter curve as a curve through said first and second intersection points.

14. An image processing device in accordance with claim 13, wherein said means for detecting a density region in said image data detects a plurality of density regions in said image data, and wherein for each of said plurality of density regions, said object detection means detects first and second intersection points between said detected edge of said document and said detected density region and sets an initial object perimeter curve as a curve through said first and second intersection points.

15. An image processing device comprising:

an object detection means for detecting an object region in image data which corresponds to an extraneous object in said image data, said object detection means detecting said object region by setting an initial object perimeter curve and adjusting said initial object perimeter curve until said adjusted object perimeter curve approximates an actual perimeter of said object region; and an image processing means for erasing said object region in said image data based on said adjusted object perimeter curve;

wherein said initial object perimeter curve is adjusted by an iterative method until said adjusted object perimeter curve converges to an actual perimeter of said object region and wherein said initial object perimeter curve is defined by a plurality of nodes and wherein said convergence of an initial object perimeter curve is determined by minimizing a combined energy for each node, said combined energy for each node being a sum of a first energy corresponding to pixels in said close search range inside said initial object perimeter curve and a second energy corresponding to pixels in said close search range outside said initial object perimeter curve.

16. A method of processing image data comprising the steps of:

detecting an object region in image data which corresponds to an extraneous object, said detection of an object region being performed by detecting an edge of a document in said image data, setting an initial object perimeter curve as a single straight line on an exterior side of a detected document edge and adjusting said initial object perimeter curve until an adjusted object perimeter curve approximates an actual perimeter of said object region; and erasing said object region in said image data based on said adjusted object perimeter curve.

17. A method of reading a document comprising the steps of:

detecting an object region in image data which corresponds to an extraneous object, said detection of an object region being performed by setting an initial object perimeter curve and adjusting said initial object perimeter curve until an adjusted object perimeter curve approximates an actual perimeter of said object region;

erasing said object region in said image data based on said adjusted object perimeter curve;

wherein said step of setting an initial object perimeter curve includes the steps of:

detecting an edge of a document in said image data;

detecting a density region in said image data; and detecting first and second intersection points between said detected edge of said document and said detected density region and setting said initial object perimeter curve as a curve through said first and second intersection points.

18. A method of reading a document in accordance with claim 17, wherein said step of adjusting said initial object perimeter curve adjusts said initial object perimeter curve based on density differences in said image data until said adjusted object perimeter curve approximates an actual perimeter of said object region.

19. A method of reading a document in accordance with claim 17, wherein said step of erasing said object region in said image data erases said object region by substituting a background image value for image values on an interior side of said adjusted object perimeter curve.

* * * * *

UNITED STATES PATENT AND TRADEMARK OFFICE
CERTIFICATE OF CORRECTION

PATENT NO. : 6,256,411 B1
DATED : July 3, 2001
INVENTOR(S) : Kentaro Iida

It is certified that error appears in the above-identified patent and that said Letters Patent is hereby corrected as shown below:

Column 10,
Lines 61 and 65, delete "cotour", and insert -- contour --.

Column 11,
Line 37, delete "an", and insert -- An --.
Line 38, delete "perimeer", and insert -- perimeter --.

Column 12,
Line 62, after "being", insert -- based on pixel values of pixels surrounding such node in a close search range, said combined energy for each node being --.

Signed and Sealed this

Twenty-fifth Day of November, 2003

JAMES E. ROGAN
*Director of the United States Patent and Trademark Office*